(12) United States Patent
Rodriguez et al.

(10) Patent No.: US 12,131,750 B1
(45) Date of Patent: Oct. 29, 2024

(54) METHODS AND SYSTEMS FOR ENHANCING THE DETECTION OF SYNTHETIC VOICE DATA

(71) Applicant: Daon Technology, Douglas (IM)

(72) Inventors: Raphael A. Rodriguez, Marco Island, FL (US); Olena Mizynchuk, Marco Island, FL (US); Davyd Mizynchuk, Kyiv (UA)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 18/660,784

(22) Filed: May 10, 2024

(51) Int. Cl.
| | | |
|---|---|---|
| *G10L 25/78* | (2013.01) | |
| *G10L 17/00* | (2013.01) | |
| *G10L 19/02* | (2013.01) | |
| *G10L 25/18* | (2013.01) | |
| *H04S 7/00* | (2006.01) | |

(52) U.S. Cl.
CPC .......... *G10L 25/78* (2013.01); *G10L 19/0204* (2013.01); *G10L 25/18* (2013.01); *H04S 7/00* (2013.01); *G10L 2025/783* (2013.01)

(58) Field of Classification Search
CPC ....... G10L 25/18; G10L 25/78; G10L 19/008; G10L 17/00; G10L 17/04; G10L 17/06; G10L 17/18; G10L 17/22
See application file for complete search history.

(56) References Cited

U.S. PATENT DOCUMENTS

| | | | |
|---|---|---|---|
| 2021/0233541 A1* | 7/2021 | Chen | G10L 17/02 |
| 2022/0375490 A1* | 11/2022 | Taylor | G10L 25/60 |
| 2023/0343342 A1* | 10/2023 | Traynor | G10L 17/06 |

* cited by examiner

*Primary Examiner* — Paras D Shah
(74) *Attorney, Agent, or Firm* — Kevin McDermott, Esq.

(57) ABSTRACT

A method for enhancing detection of synthetic voice data is provided that includes converting, by an electronic device, monophonic voice data into stereophonic voice data. The stereophonic voice data includes a first channel signal and a second channel signal. Moreover, the method includes decomposing, by a trained machine learning model, the stereophonic voice data into a mid-signal and a side signal. The method also includes determining artifacts indicative of synthetic generation in the structured and secondary artifacts, calculating, based on the determined artifacts, a probability score reflecting the likelihood the monophonic voice data was synthetically generated, and comparing the probability score against a threshold value. When the probability score satisfies the threshold value, there is a high likelihood that the monophonic voice data includes synthetic artifacts, and an alert is generated indicating the monophonic voice data is potentially fraudulent.

20 Claims, 7 Drawing Sheets

METHODS AND SYSTEMS FOR ENHANCING THE DETECTION OF SYNTHETIC VOICE DATA

BACKGROUND OF THE INVENTION

This invention relates generally to voice data, and more particularly, to methods and systems for enhancing detection of synthetic voice data.

The development of artificial intelligence (AI) and machine learning (ML) technologies has enabled the development of synthetic speech and deep fake technologies capable of generating synthetic speech that can be difficult to distinguish from genuine human speech. Such synthetic speech may mimic the intonation, rhythm, and emotional nuances of genuine human speech. As a result, synthetic speech may be a threat to security systems that use voice data to authenticate or verify the identities of people. For example, synthetic speech may increase the risks of successfully perpetuating identity fraud on people and institutions, increase the risk of unauthorized access to confidential information stored on computer systems as well as the computer systems themselves, and increase the risks that misinformation campaigns will be successful amongst other things.

Known security systems, including conventional voice watchlist systems, are generally designed to detect known security threats based on historical data or predefined criteria. Moreover, known systems typically analyze human voice digital streams and recordings that are predominantly monophonic. That is, voice digital streams and recordings limited to one audio channel. Unfortunately, such security systems have been known to fail to identify synthetic speech in monophonic voice digital streams and recordings. Consequently, there is a need for more advanced detection mechanisms that can analyze human voice digital streams and recordings to enhance the detection of synthetic voice data and that rapidly adapts to the evolving sophistication of synthetic speech technologies.

Thus, it would be advantageous and an improvement over the relevant technology to provide a method, a system, and a computer-readable recording medium capable of enhancing detection of synthetic voice data and that rapidly adapts to the evolving sophistication of synthetic speech technologies.

BRIEF DESCRIPTION OF THE INVENTION

An aspect of the present disclosure provides a method for enhancing detection of synthetic voice data including converting, by an electronic device, monophonic voice data into stereophonic voice data. The stereophonic voice data includes a first channel signal and a second channel signal. The method also includes decomposing, by a trained machine learning model, the stereophonic voice data into a mid-signal and a side signal. The side signal represents the difference between the first and second channel signals. Moreover, the method includes analyzing the side signal to detect structured artifacts associated with synthetic voice generation. The structured artifacts are detected based on deviations from expected patterns in natural human speech. Furthermore, the method includes conducting a spectral analysis of the side signal to detect secondary artifacts. The secondary artifacts include frequency components or modulations uncharacteristic of human speech. Additionally, the method includes determining artifacts indicative of synthetic generation in the structured and secondary artifacts, calculating, based on the determined artifacts, a probability score reflecting the likelihood the monophonic voice data was synthetically generated, and comparing the probability score against a threshold value. In response to determining the probability score satisfies the threshold value, the method determines there is a high likelihood that the monophonic voice data includes synthetic artifacts and generates an alert indicating the monophonic voice data is potentially fraudulent.

Another aspect of the present disclosure provides a non-transitory computer-readable recording medium in an electronic device for enhancing detection of synthetic voice data. The non-transitory computer-readable recording medium stores instructions which when executed by a hardware processor performs the steps of the methods described above.

Yet another aspect of the present disclosure provides an electronic device for enhancing detection of synthetic speech including a processor and a memory configured to store data. The electronic device is associated with a network and the memory is in communication with the processor and has instructions stored thereon which, when read and executed by the processor, cause the electronic device to convert monophonic voice data into stereophonic voice date. The stereophonic voice data includes a first channel signal and a second channel signal. Moreover, the instructions which, when read and executed by the processor, cause the electronic device to decompose, by a trained machine learning model, the stereophonic voice data into a mid-signal and a side signal. The side signal represents the difference between the first and second channel signals.

Moreover, the instructions which, when read and executed by the processor, cause the electronic device to analyze the side signal to detect structured artifacts associated with synthetic voice generation. The structured artifacts are detected based on deviations from expected patterns in natural human speech. Furthermore, the instructions which, when read and executed by the processor, cause the electronic device to conduct a spectral analysis of the side signal to detect secondary artifacts. The secondary artifacts include frequency components or modulations uncharacteristic of human speech.

Additionally, the instructions which, when read and executed by the processor, cause the electronic device to determine artifacts indicative of synthetic generation in the structured and secondary artifacts, calculate, based on the determined artifacts, a probability score reflecting the likelihood the monophonic voice data was synthetically generated, and compare the probability score against a threshold value. In response to determining the probability score satisfies the threshold value, the instructions which, when read and executed by the processor, cause the electronic device to determine there is a high likelihood that the monophonic voice data includes synthetic artifacts and generate an alert indicating the monophonic voice data is potentially fraudulent.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
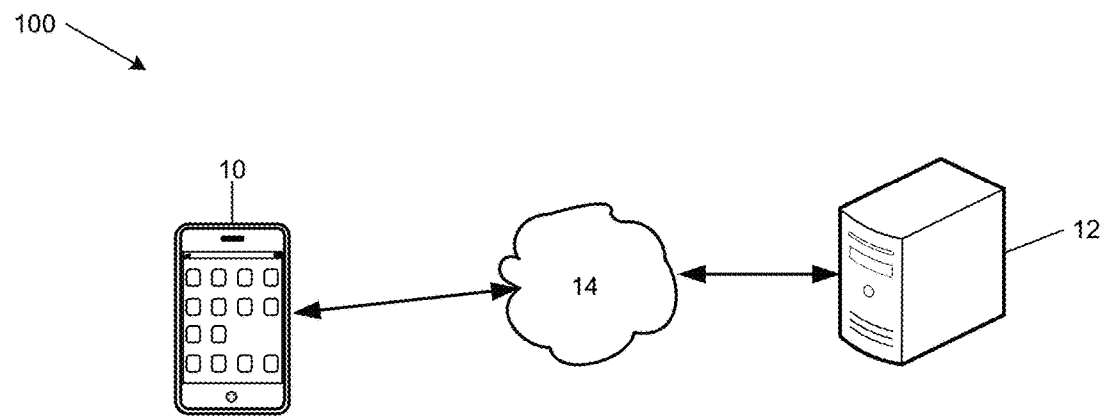
FIG. 1 is a schematic diagram of an example computing system for enhancing detection of synthetic voice data according to an embodiment of the present disclosure.

FIG. 1 is a schematic diagram of an example computing system 100 for enhancing detection of synthetic voice data provided, for example, during a remotely conducted authentication transaction according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 may be referred to herein as a user. Additionally, a user may be any person being authenticated, for example, during an authentication transaction.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
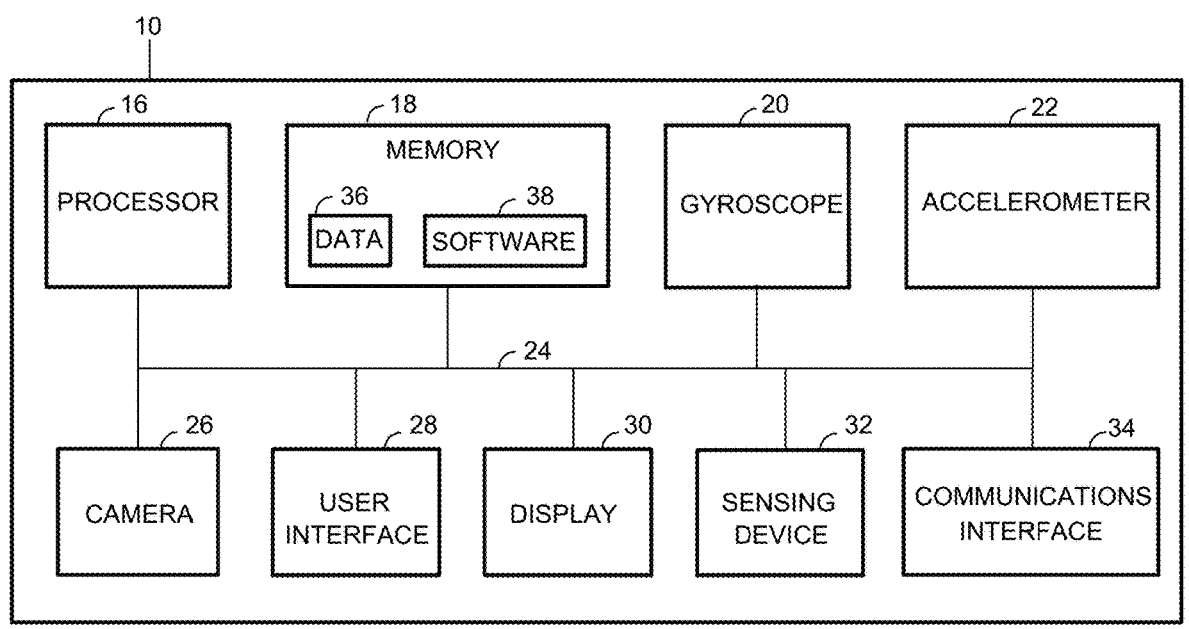
FIG. 2 is a more detailed schematic diagram illustrating an example electronic device in the system of FIG. 1.

FIG. 2 is a more detailed schematic diagram illustrating the example electronic device 10 used for enhancing detection of synthetic voice data provided, for example, during a remotely conducted authentication transaction according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users. Each data record is typically for a respective user. The data record for each user may include data such as, but not limited to, data captured during authentication transactions, biometric templates, personal data, and authentication transaction results. Data captured during authentication transactions may include, but is not limited to, biometric modality data and data regarding the context in which the biometric modality data was captured. The memory 18 may also store genuine artifact patterns and synthetic artifact patterns. The stored patterns may be referred to as record artifact patterns. Moreover, the memory 18 may store synthetic artifacts and properties relating to synthetic artifacts, for example, statistical properties. The stored synthetic artifacts may be referred to as record synthetic artifacts.

A biometric template can be any type of mathematical representation of biometric modality data. Biometric modality data is the data of a biometric modality of a person. For the methods and systems described herein, the biometric modality is voice. Monophonic signals, stereophonic signals, mid-signals, and side signals may also be stored in the memory 18.

The memory 18 may be considered a database. It is contemplated by the present disclosure that the database may alternatively be implemented as a decentralized database employing blockchain technology. Such an alternative implementation would store the same data as described herein for the memory 18.

Voice biometric data may be captured by the electronic device 10 by recording a user speaking a phrase. Voice biometric data may alternatively, or additionally, be in the form of a digital stream. The phrase may be secret. Captured voice biometric data may be temporarily or permanently stored in the electronic device 10 or in any device capable of communicating with the electronic device 10 via the network 14. Voice biometric data is captured as audio data. Audio signals are audio data. The audio data is stored as an audio data file.

As used herein, capture means to record temporarily or permanently, any data including, for example, voice biometric data of a person while speaking. Stored captured voice biometric data and stored biometric templates may be referred to as record voice biometric data. Voice biometric data may alternatively be referred to herein as speech or voice data. Similarly, speech may alternatively be referred to herein as voice biometric data or voice data.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, authentication applications, machine learning algorithms (MLA), trained machine learning models, software for conducting spectral analysis on voice data, software for detecting artifacts in voice data, software for applying statistical analysis to voice data, pattern recognition algorithms, and any other software and/or any type of instructions associated with algorithms, processes, or operations for controlling the general functions and operations of the electronic device 10. The software may also include computer programs that implement buffers and use RAM to store temporary data.

Authentication applications enable the electronic device 10 to conduct user verification and identification (1:N) transactions with any type of authentication data, where "N" is a number of candidates.

A machine learning algorithm (MLA) may be trained to create a machine learning model for enhancing prediction of potential security threats that may be present during authentication transactions, analyzing voice data for characteristics typical of synthetic speech and various speech characteristics of captured voice data. Machine learning models have parameters which are modified during training to optimize functionality of the models trained using a machine learning algorithm (MLA). Machine learning models may be retrained or updated using data captured during authentication transactions. MLAs include at least classifiers and regressors. Example classifiers are Deep Neural Networks (DNNs), Time Delay Neural Networks (TDNNs), Recurrent Neural Networks (RNNs), Residual Networks (ResNets), Generative Adversarial Networks (GANs).

Machine learning models may be trained on extensive datasets including numerous examples of both authentic and synthetic voice data samples, to learn the distinguishing features and patterns of each. When presented with voice data during, for example, an authentication transaction the trained machine learning model may evaluate the extracted features against the learned distinguishing features and patterns to determine how closely the extracted features align with either the synthetic or authentic voice data samples. Performance of such trained machine learning models may be evaluated using standard metrics, for example, accuracy, precision, recall and F1-score.

Moreover, such trained machine learning models may be updated by periodically incorporating new voice data samples and feedback to enable continuous learning and adaption to emerging deepfake techniques and ensuring sustained relevance and accuracy in detecting synthetic voice data. The new voice data samples may include verified authentic recordings and detected synthetic artifacts. Updating machine learning models facilitates adjusting training parameters of the model based on evolving characteristics of synthetic voice generation techniques as well as optimizing standard metrics of the model. Additionally, feedback on detection accuracy, including false positive and false negative results, may be included in the update to refine predictive capabilities of the trained machine learning model.

Synthetic data generation and noise addition techniques may be used to enhance the robustness of the trained machine learning model against a range of synthetic artifacts and recording conditions.

The process of verifying the identity of a user is known as a verification transaction. Typically, during a verification transaction based on voice data, a verification template is generated from a spoken identification verification phrase captured during the transaction. The verification template is compared against a corresponding recorded enrolment template of the user and a score is calculated for the comparison. The recorded enrolment template is created during enrolment of the user in an authentication system. If the calculated score is at least equal to a threshold value, the identity of the user is verified as true. Alternatively, the captured voice data may be compared against the corresponding record voice data to verify the identity of the user.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. The camera 26 may be integrated into the electronic device 10 as one or more front-facing cameras and/or one or more rear facing cameras that each incorporates a sensor, for example and without limitation, a CCD or CMOS sensor.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The microphone may be used to capture voice biometric data of a user while speaking during, for example, an authentication transaction.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed, or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown). The exchange of information may involve the transmission of radio frequency (RF) signals through an antenna (not shown). Moreover, the exchange of information may be between the electronic device 10, the server 12, the computer 14, other electronic devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

The server 12 includes most of the same components as described herein for the electronic device 10. However, because the server 12 is primarily stationary, not primarily mobile, the server 12 may not include the gyroscope 20 and/or the accelerometer 22.

Stereophonic voice data includes two distinct channel signals, a left channel signal and a right channel signal. However, voice data captured during, for example, authentication transactions is predominantly monophonic. As such, captured voice data typically lacks significant structured stereo information. Monophonic voice data may be converted into stereophonic voice data having left and right channel signals using, for example, digital signal processing techniques. For genuine monophonic recordings there should be little or no difference between the left and right channel signals after conversion into stereo components. The left and right channel signals from the converted monophonic voice data may be used to create a mid-signal and a side signal.

A mid-signal may be created by averaging the left and right channel signals, for example, according to the equation Mid(t)=(Left(t)+Right (t))/2, where Mid(t) is the mid-signal at any point in time, Left(t) is the left channel signal at any point in tie, Right(t) is the right channel at any point in time, and t represents the point in time. The mid-signal includes the core content that is typically identical or very similar in both the left and right channels and thus represents the monophonic content in a genuine monophonic recording. The mid-signal may alternatively be calculated as the sum of the left and right channel signals.

A side signal may be created by calculating the difference between the left and right channel signals, for example, according to the equation Side(t)=Left(t)−Right (t), wherein Side(t) is the difference between the left and right channels at any point in time. For authentic monophonic voice data, the side signal should yield values close to zero because the left and right channels are very similar. Synthetic voice generation processes often introduce detectable artifacts into the voice data. Thus, values of the side signal that are different than zero may indicate that the side signal includes stereo effects or manipulations which could indicate that the voice data from which the side signal was derived includes synthetic alterations.

Creating the side signal facilitates isolating the stereo effects in monophonic voice data that do not exist in genuine monophonic voice data.

Figure 3:
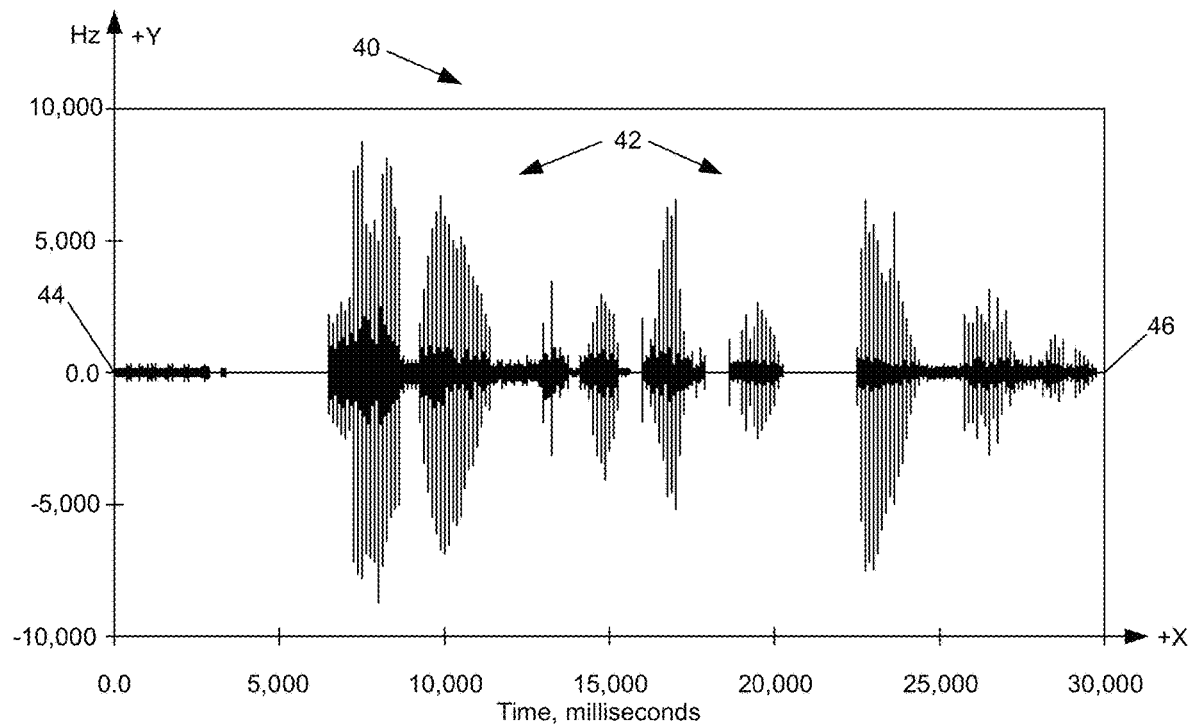
FIG. 3 is a diagram illustrating an example first channel signal captured by the electronic device while a user spoke a phrase.

FIG. 3 is a diagram 40 illustrating an example left-side channel signal 42. The signal 42 is audio data that represents captured voice data of a user. The signal 42 may be stored in the data record of the user associated with the electronic device 10. The signal 42 and a template generated therefrom may be referred to as record audio data or record voice data.

The signal 42 is plotted on a Cartesian coordinate system having X and Y-axes. The signal 42 extends from the origin 44 to a terminus 46 and has a duration of about three (3) seconds. The duration of the signal 42 depends on the length of the spoken phrase which may also vary. Frequency is measured along the Y-axis in Hertz.

Figure 4:
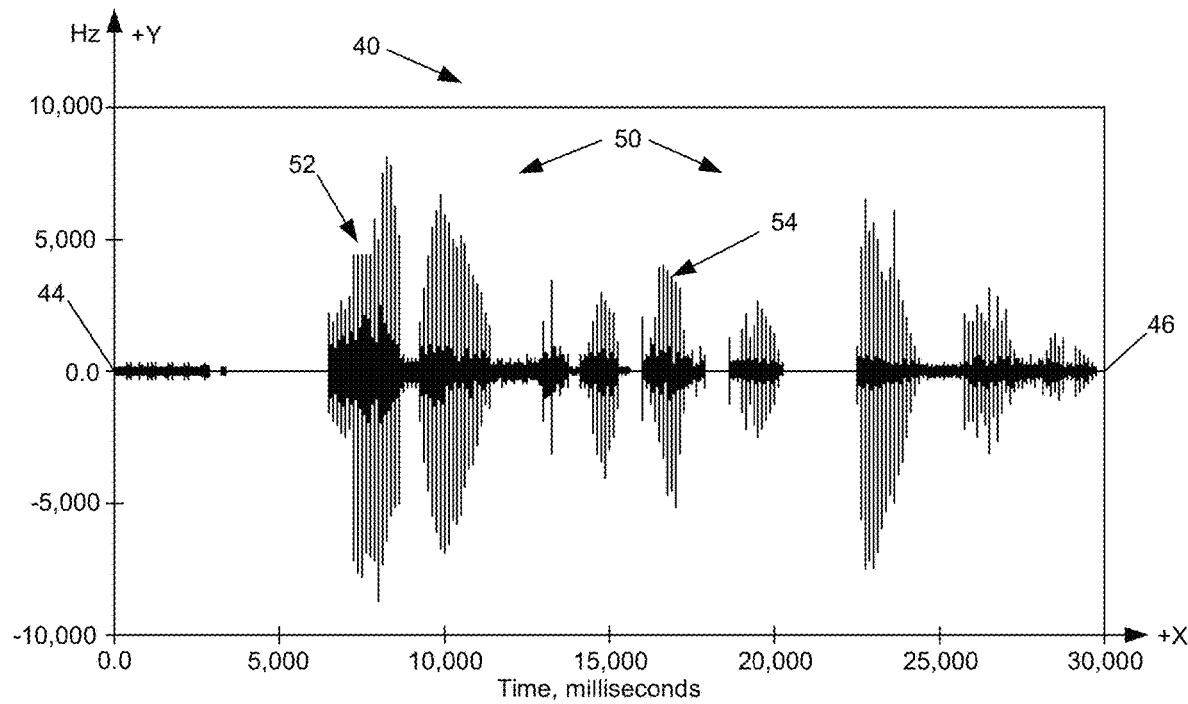
FIG. 4 is a diagram illustrating an example second channel signal captured by the electronic device while the user spoke the phrase.

The information shown in FIG. 4 is the same information shown in FIG. 3 as described in more detail below. As such, features illustrated in FIG. 4 that are identical to features illustrated in FIG. 3 are identified using the same reference numerals used in FIG. 3.

FIG. 4 is a diagram 48 illustrating an example right-side channel signal 50. The right-side channel signal 50 is substantially the same as the left side channel signal 40. However, there are two regions 52 and 54 in the signal 50 that are different than the left side channel signal 40. More specifically, the region 52 of the signal 50 is at a constant frequency of about 4.5 megahertz (MHz) versus well over 10 MHz in the corresponding region of the left channel signal 42. The region 54 has a frequency that decreases over time from about 4.5 MHz to about 4.0 MHz, while the corresponding region of signal 42 is well above 5 MHz over the same period of time. These differences may be evidence of synthetic manipulation or generation.

Although the example right side channel signal 50 includes two regions 52 and 54 that are different than the example left side signal 42, it is contemplated by the present disclosure that there may be any number of different regions or differences between the two signals.

Figure 5:
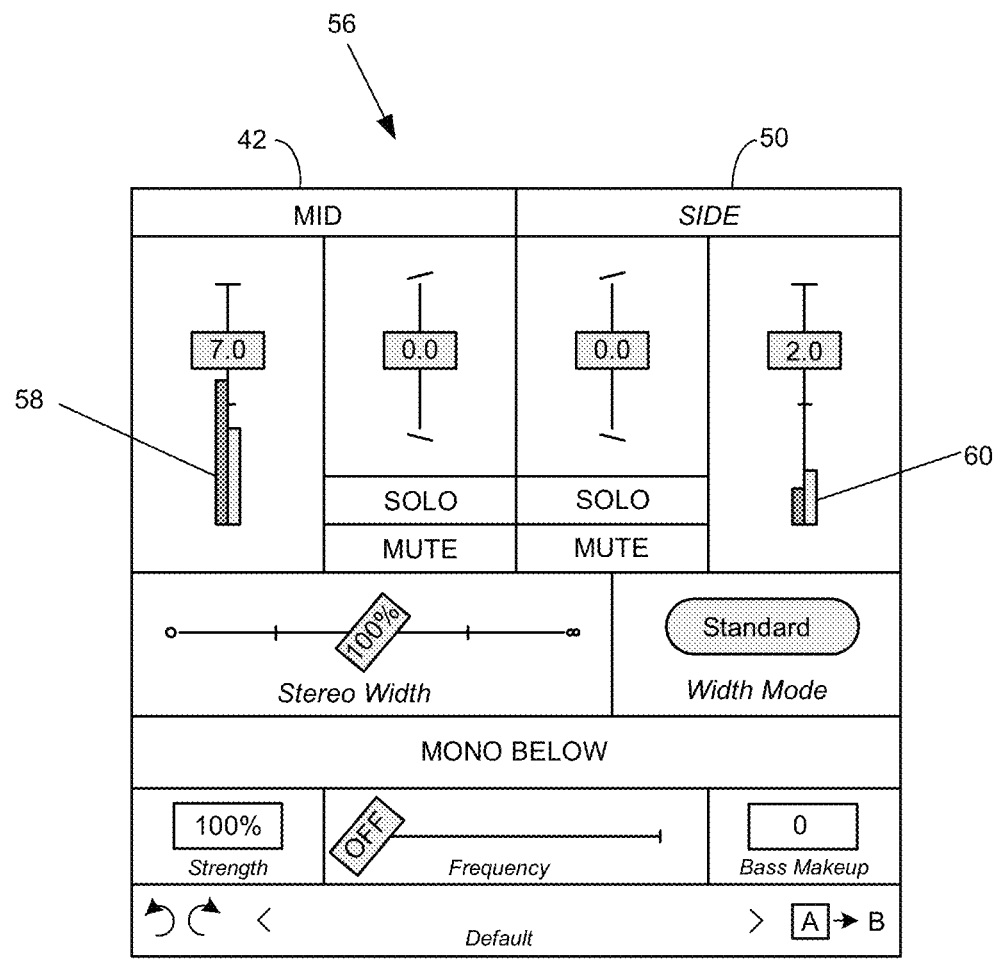
FIG. 5 is a diagram of an example graphical user interface illustrating example frequencies of example mid and side signals.

FIG. 5 is a diagram of an example graphical user interface 56 illustrating example frequencies of the mid-signal 42 and the side signal 50 at the time t. More specifically, the mid-signal has a frequency of seven (7.0) megahertz (MHz) and the side signal has a frequency of two (2.0) MHz. Thus, the frequency of the side signal is substantially different than zero.

Synthetic voice generation processes, especially those used to create deepfakes, often inadvertently introduce detectable artifacts and/or anomalies into the stereo field. These artifacts and/or anomalies, which are not present in authentic monophonic voice streams and recordings or properly produced stereo voice renditions, can be indicative of synthetic manipulation or artificial generation.

For authentic monophonic voice data converted into stereophonic voice data, the side signal should yield values close to zero because the left and right channels are very similar. However, values different than zero may indicate that the signal includes stereo effects or manipulations which could indicate that the monophonic voice data includes synthetic alterations. Because the frequency of the side signal 50 is substantially different than zero, the difference may represent an artifact or anomaly indicating the monophonic voice data was synthetically generated.

Figure 6:
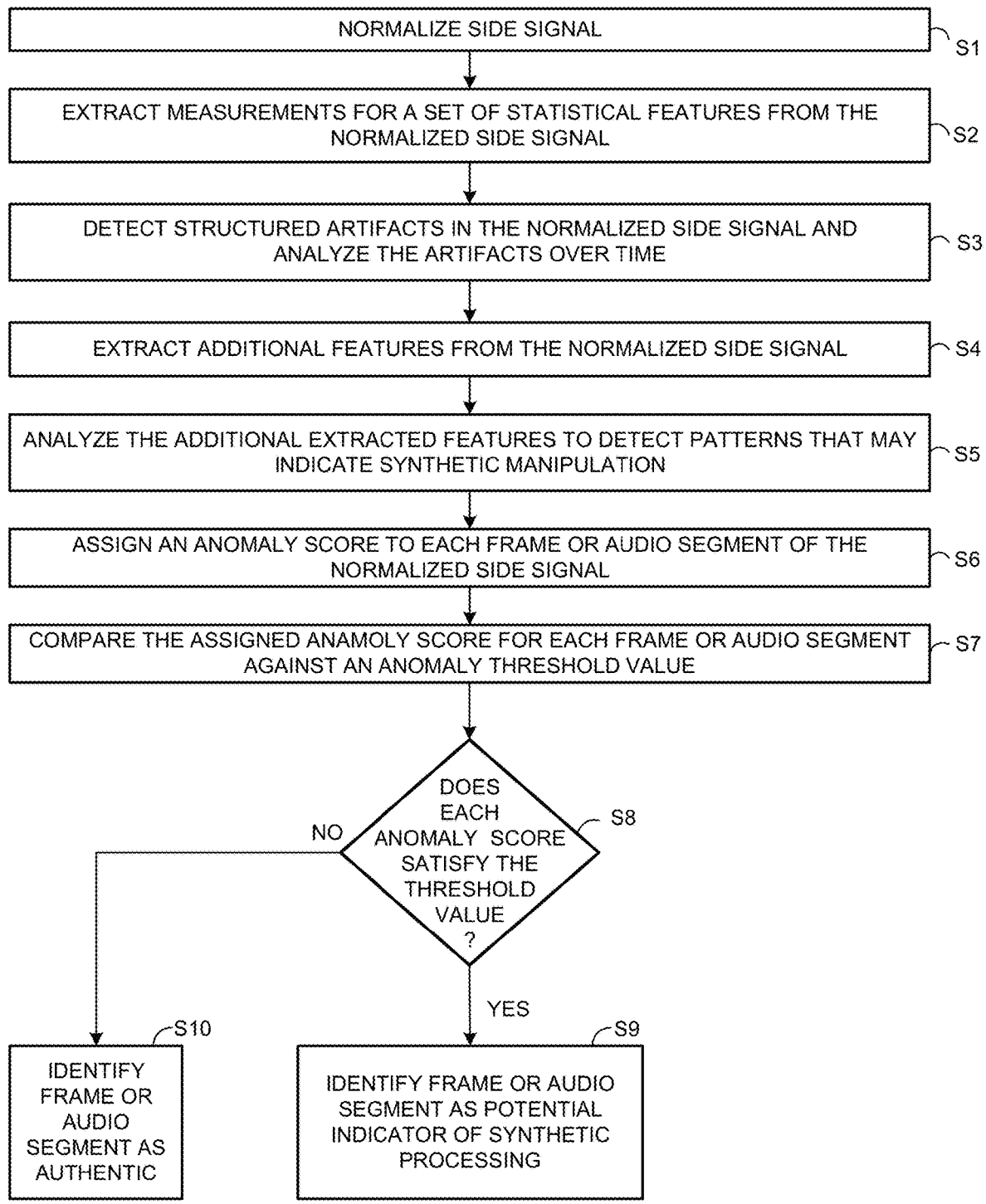
FIG. 6 is a diagram illustrating an example method and algorithm for analyzing artifacts in a side signal according to an embodiment of the present disclosure.

FIG. 6 is a diagram illustrating an example method and algorithm for analyzing artifacts in a side signal according to an embodiment of the present disclosure. The side signal is created from monophonic voice data. Detected artifacts may indicate that the monophonic voice data from which the side signal was created is synthetic. FIG. 6 illustrates example steps performed when the electronic device 10 runs software 38 stored in the memory 18 to analyze artifacts in a side signal.

In step S1, the software 38 executed by the processor 16 causes the electronic device 10 to normalize the side signal to mitigate the variance due to recording levels or environmental factors. Normalizing the side signal standardizes amplitudes and facilitates consistent feature analysis across different voice data samples. The software 38 executed by the processor 16 may also cause the electronic device 10 to remove irrelevant frequency bands or noise from the side signal to facilitate focusing on the areas of the side signal where vocal components are most likely to appear. The side signal may also be divided into frames or audio segments.

Next, in step S2, the software 38 executed by the processor 16 causes the electronic device 10 to extract measurements for a set of statistical features from the normalized side signal. The statistical features include, but are not limited to, mean, variance, spectral entropy, skewness, kurtosis, higher-order moments, spectral flux, zero-crossing rate, and energy entropy. The statistical features can generally be divided into two groups, distribution-based measures and dynamics-based measures.

The distribution-based measures focus on the statistical distribution of properties in a signal and include spectral entropy, skewness, kurtosis, and higher-order moments. Spectral entropy measures the randomness of the frequency distribution of the side signal, which facilitates understanding how evenly the power of the signal is distributed across different frequencies. Skewness determines the asymmetry of the distribution about its mean and can indicate if the side signal has more power in higher or lower frequencies relative to the mean frequency. Kurtosis assesses the peakedness of the distribution, which can indicate whether the distribution is more concentrated (i.e., leptokurtic) or spread out i.e., (platykurtic) compared to a normal distribution. Higher-order moments are extensions of skewness and kurtosis and provide deeper insights into the shape of the distribution.

Dynamics-Based Measures focus on how a signal changes over time, providing insights into the temporal properties of the signal. The dynamics-based measures include spectral flux, zero-crossing rate, and energy entropy. Spectral flux measures the rate of change in the power spectrum of the signal over time. The spectral flux is useful for detecting sudden changes in the sound spectrum, which might indicate splicing or other forms of audio manipulation. The zero-crossing rate counts the rate at which the signal changes from positive to negative and vice versa. The zero-crossing rate is indicative of the frequency content of the signal, with higher rates typically associated with higher frequencies or noise. Energy entropy measures the unpredictability in the energy distribution of the signal over time. Higher entropy can indicate more complex or synthetic manipulations. The spectral flux, zero-crossing rate, and energy entropy are indicative of different aspects of the acoustic properties of the side signal.

In step S3, the software 38 executed by the processor 16 causes the electronic device 10 to detect structured artifacts within the side signal using the extracted measurements and to analyze the structured artifacts over time to find patterns or inconsistencies atypical for human voice data. Structured artifacts are specific patterns or irregularities within the side signal that deviate from normal characteristics expected in human speech. Structured artifacts may be spontaneous and non-repetitive and are absent from authentic speech. Structured artifacts may be introduced during the creation of synthetic or manipulated voice data and exhibit certain regularities or structures that can be quantitatively identified. Additionally, in step S3, the software 38 executed by the processor 16 may cause the electronic device 10 to transform segments of the side signal into the frequency domain using, for example, Fourier Transforms to detect anomalies in specific frequency bands.

When a statistical feature, for example, spectral flux, spectral entropy, and others that measure different aspects of the power spectrum of the audio signal detect an anomaly, the detected anomaly is categorized as a secondary artifact.

In step S4, the software 38 executed by the processor 16 causes the electronic device 10 to extract additional features from each frame or audio segment of the side signal. The additional features are related to, for example, the frequency, amplitude, and temporal consistency of the side signal. In step S5, the software 38 executed by the processor 16 causes the electronic device 10 to analyze the additional features to identify patterns that may indicate synthetic manipulation.

Next, in step S6, the software 38 executed by the processor 16 causes the electronic device 10 to assign an anomaly score to each frame or audio segment of the side signal. The anomaly score for each frame or audio segment quantitively represents the likelihood that the respective frame or audio segment has been synthetically manipulated. The anomaly score also reflects the relationship between the extracted additional features and the corresponding additional features for authentic voice data and synthetic voice data. That is, the closer the extracted additional features are to the corresponding authentic features the more likely the voice data is authentic. Conversely, the closer the extracted additional features are to the corresponding synthetic features the more likely the voice data is synthetic.

The range of anomaly scores may be, for example, from zero (0) to one (1), where zero can indicate there is a very close relationship between the extracted additional features and the corresponding authentic features indicating the voice data is very likely authentic. One (1) can indicate there is a very close relationship between the extracted additional features and the corresponding synthetic features indicating the voice data is very likely synthetic.

It is contemplated by the present disclosure that when determining the anomaly score the degree of alignment with synthetic record data and probabilistic outputs may be considered to assign nuanced anomaly scores that reflect varying levels of certainty regarding synthetic manipulation. Each structured artifact may be characterized based on the respective statistical properties of the structured artifact, and then mapped against record synthetic artifacts to enhance the accuracy of detection. The mapping result may be considered in determining the anomaly score.

In step S7, the software 38 executed by the processor 16 causes the electronic device 10 to compare the assigned anomaly score for each frame or audio segment against an anomaly threshold value. In step S8, the software 38 executed by the processor 16 causes the electronic device 10 to determine whether each anomaly score satisfies the threshold value. For each anomaly score that satisfies the threshold value, in step S9, the software 38 executed by the processor 16 causes the electronic device 10 to identify the respective frame or audio segment as a potential indicator of synthetic processing. For each anomaly score that fails to satisfy the threshold value, in step S10, the software 38 executed by the processor 16 causes the electronic device 10 to decide the respective frame or audio segment is authentic. Identifying the frames or audio segments as authentic or a potential indicator of synthetic processing facilitate providing nuanced insights into the likelihood that the side signal was created from synthetic monophonic voice data.

The threshold value may be satisfied when an anomaly score is less than or equal to the threshold value. Other threshold values may be satisfied when the anomaly score is equal to or greater than the threshold value. Alternatively, the threshold value may include multiple threshold values, each of which is required to be satisfied to satisfy the threshold value.

It is contemplated by the present disclosure that the assigned anomaly scores may be aggregated or analyzed collectively to decide whether the monophonic voice data from which the side signal was created is likely synthetic. The assigned anomaly scores may be aggregated by, for example, averaging the anomaly scores, assessing anomaly score distributions, or employing more complex statistical models. If a majority of the frames in the side signal, or in important segments of the side signal, are determined to be potential indicators of synthetic processing the voice data from which the side signal was created may be considered synthetic.

The side signal may also be analyzed using spectral analysis techniques to detect frequency components or modulations atypical for a natural human voice, potentially signifying a synthetic artifact.

Figure 7:
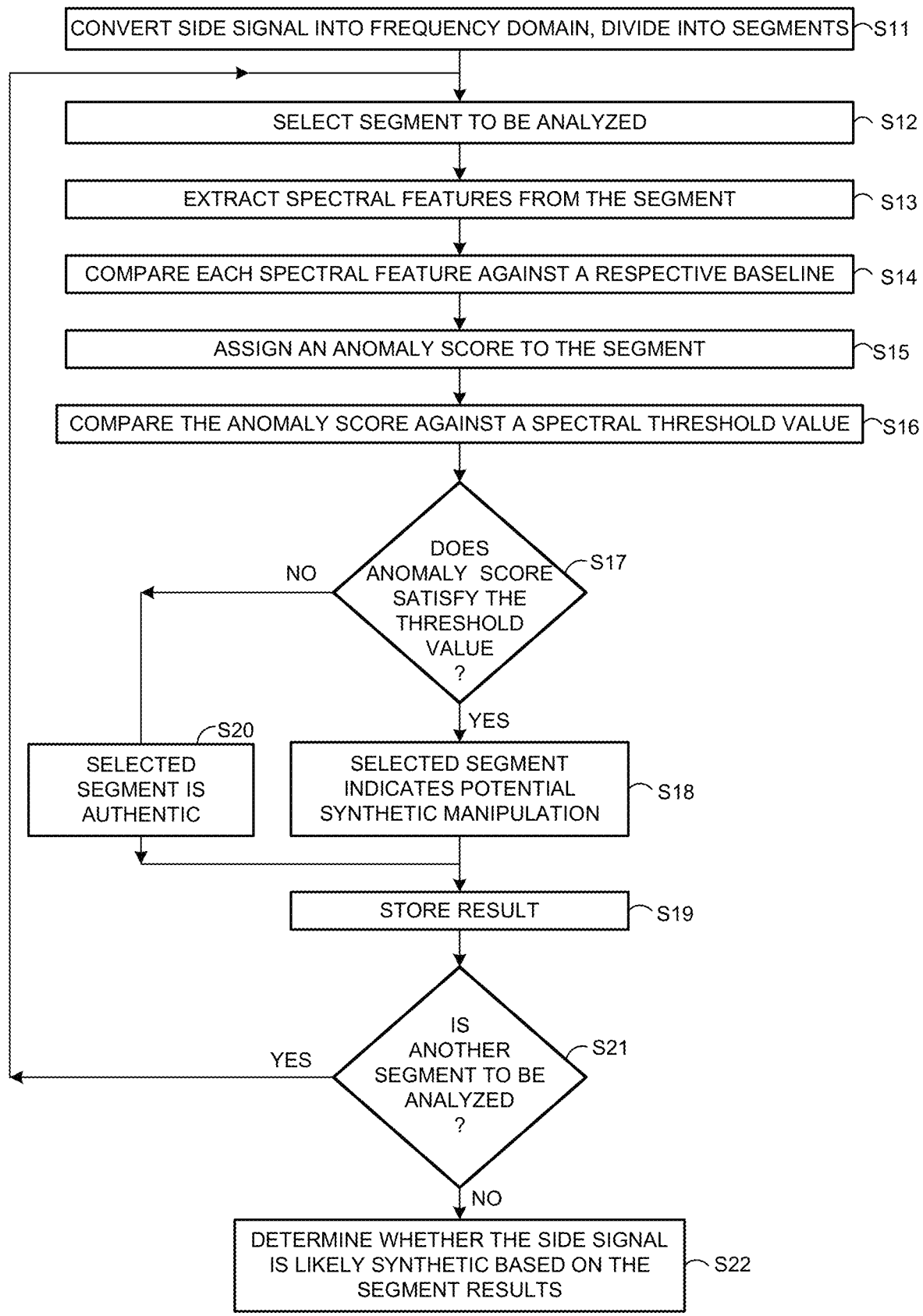
FIG. 7 is a diagram illustrating an example method and algorithm for conducting a spectral analysis of the side signal according to an embodiment of the present disclosure.

FIG. 7 is a diagram illustrating an example method and algorithm for conducting a spectral analysis of a side signal according to an embodiment of the present disclosure. The side signal is created from monophonic voice data. FIG. 7 illustrates example steps performed when the electronic device 10 runs software 38 stored in the memory 18 to conduct a spectral analysis of the side signal.

In step S11, the software 38 executed by the processor 16 causes the electronic device 10 to convert the side signal into the frequency domain and to divide the converted signal into segments. The side signal may be converted into the frequency domain in any manner. For example, a Fast Fourier Transform may be applied to the side signal to effect the conversion. Converting the side signal into the frequency domain facilitates analyzing spectral components of the side signal. The signal may be divided into segments in any manner.

It should be understood that the side signal has different frequencies. Also, in step S11, the software 38 executed by the processor 16 causes the electronic device 10 to divide the converted signal according to frequency. More specifically, bins are established that each represent the amplitude of a specific frequency within the side signal. The amplitudes of specific frequencies within the side signal are assigned to the corresponding bin.

Next, in step S12, the software 38 executed by the processor 16 causes the electronic device 10 to select a segment of the converted side signal to analyze. Any method may be used to select the segment.

Next, in step S13, the software 38 executed by the processor 16 causes the electronic device 10 to extract spectral features from the converted side signal. Spectral features include, but are not limited to, peaks in the converted side signal, bandwidth, harmonics of the converted side signal, unusual frequency components, harmonic distortions, and modulations that are uncharacteristic of human speech.

Peaks in the converted side signal are typically to prominent points in the frequency spectrum of the side signal where energy concentration is significantly higher than surrounding frequencies. Peaks can indicate specific tones or sounds that are artificially generated or manipulated.

Bandwidth involves examining the range of frequencies present in the side signal. In manipulated voice data, the bandwidth might be unnaturally narrow or exhibit unusual expansions at certain frequencies.

Harmonics involves studying the harmonic structure of signals. Natural human speech has a characteristic harmonic structure due to the vocal tract's resonant frequencies. Deviations in the harmonic structure can suggest manipulation or synthetic generation.

Unusual frequency components are frequencies that do not typically appear in human speech so can be a strong indicator of synthetic audio. Unusual frequency components may be created from digital artifacts introduced while creating a signal.

More specifically, in step S13, the software 38 executed by the processor 16 causes the electronic device 10 to detect significant peaks within the converted side signal. The significant peaks correspond to dominant frequency components which is where the energy of a signal is most concentrated. For each detected significant peak, the software 38 executed by the processor 16 causes the electronic device 10 to analyze the bandwidth or energy about each detected peak to facilitate detecting broad or narrow modulations. Detecting the peaks facilitates indicating unusual patterns or anomalies that may indicate a signal has been manipulated or is synthetic.

Voice data typically has dominant peaks at fundamental speech frequencies which are generally between eighty-five (85) Hertz (Hz) and two-hundred-fifty-five (255) Hz depending on the gender and vocal characteristics of the speaker. A significant peak detected at, for example, 500 Hz or higher might be unusual and indicative of synthetic manipulation. Such a peak may be created from a voice synthesis algorithm attempting to replicate or modify human speech tones, potentially introducing frequencies that do not naturally occur in unaltered human vocal outputs.

A peak might be considered significant if the peak is at least two standard deviations above the mean amplitude of the spectrum in the relevant frequency band. Human speech components generally range between 0 Hz to 4000 Hz. Peaks outside this range, especially those that are significantly higher than the average spectral components, might be identified for further analysis and human assisted review.

Moreover, in step S13, the software 38 executed by the processor 16 causes the electronic device 10 to analyze the harmonic relationship between the detected peaks to assess whether the detected modulations correspond to expected modulation patterns in typical human speech.

In step S14, the software 38 executed by the processor 16 causes the electronic device 10 to compare each spectral feature against a respective baseline spectrum. The baseline spectrum for each feature can be derived from authentic human voice data. Moreover, the software 38 executed by the processor 16 causes the electronic device 10 to calculate a deviation from the spectral baseline for each spectral feature. The calculation involves quantifying differences in certain spectral parameters, for example, frequency, amplitude, and phase.

In step S15, the software 38 executed by the processor 16 causes the electronic device 10 to assign an anomaly score to the selected segment based on the calculated deviation. The anomaly score can be a cumulative anomaly score. That is, the anomaly score can be calculated for each spectral feature based on the respective comparison and then the cumulative anomaly score can be calculated from the anomaly scores. Where there are large differences between a spectral feature and the baseline spectrum for the feature, the anomaly score for that spectral feature is typically higher.

In step S16, the software 38 executed by the processor 16 causes the electronic device 10 to compare the assigned anomaly score for the selected segment against a spectral threshold value. The spectral threshold value may be dynamically adjustable. In step S17, the software 38 executed by the processor 16 causes the electronic device 10 to determine whether the spectral anomaly score satisfies the spectral threshold value. If the spectral anomaly score satisfies the spectral threshold value, in step S18, the software 38 executed by the processor 16 causes the electronic device 10 to determine that the selected segment indicates potential synthetic manipulation. Next, in step S19, the software 38 executed by the processor 16 causes the electronic device 10 to store the determination that the selected segment indicates potential synthetic manipulation in, for example, the memory 18. Otherwise, when the spectral anomaly score fails to satisfy the spectral threshold value, in step S20, the software 38 executed by the processor 16 causes the electronic device 10 to determine that the selected segment is authentic.

The spectral threshold value may be satisfied when a spectral anomaly score is less than or equal to the spectral threshold value. Other spectral threshold values may be satisfied when the spectral anomaly score is equal to or greater than the spectral threshold value. Alternatively, the spectral threshold value may include multiple spectral threshold values, each of which is required to be satisfied to satisfy the spectral threshold value.

Next, in step S19, the software 38 executed by the processor 16 causes the electronic device 10 to store the determination that the selected segment is authentic, for example, the memory 18.

In step S21, the software 38 executed by the processor 16 causes the electronic device 10 to determine whether another segment of the converted side signal is to be analyzed. If yes, in step S12, the software 38 executed by the processor 16 causes the electronic device 10 to select another segment to be analyzed. Otherwise, in step S22, the software 38 executed by the processor 16 causes the electronic device 10 to determine, based on the determinations stored in, for example, the memory 18 whether the side signal is likely synthetic. The determination may be made in any manner. For example, the stored determinations may be aggregated into a single score for comparison against a threshold value. If the threshold value is satisfied, the side signal may be considered to contain spectral discrepancies indicative of synthetic voice artifacts. Otherwise, the side signal may be considered authentic. Alternatively, if one of the anomaly scores satisfies the spectral threshold value, the monophonic voice data from which the side signal was created may be deemed potentially synthetic.

Alternatively, or additionally, the stored determinations may be analyzed to determine whether anomaly scores indicating potential synthetic manipulation are identified consistently across the side signal or in certain segments. If so, the side signal may be determined to be potentially synthetic.

Anomalies detected as a result of analyzing spectral features of the side signal are also considered to be secondary artifacts.

Using the methods and algorithms for conducting a spectral analysis of the side signal as described herein enables leveraging advanced signal processing and statistical analysis techniques to enhance the detection and identification of synthetic voice data within the realm of digital security.

Natural ambient noise or imperfections in the voice data capture process may introduce stereo information into a monophonic signal. Such noise and/or imperfections typically lack the consistent or structured nature expected of synthetic voice data.

Figure 8:
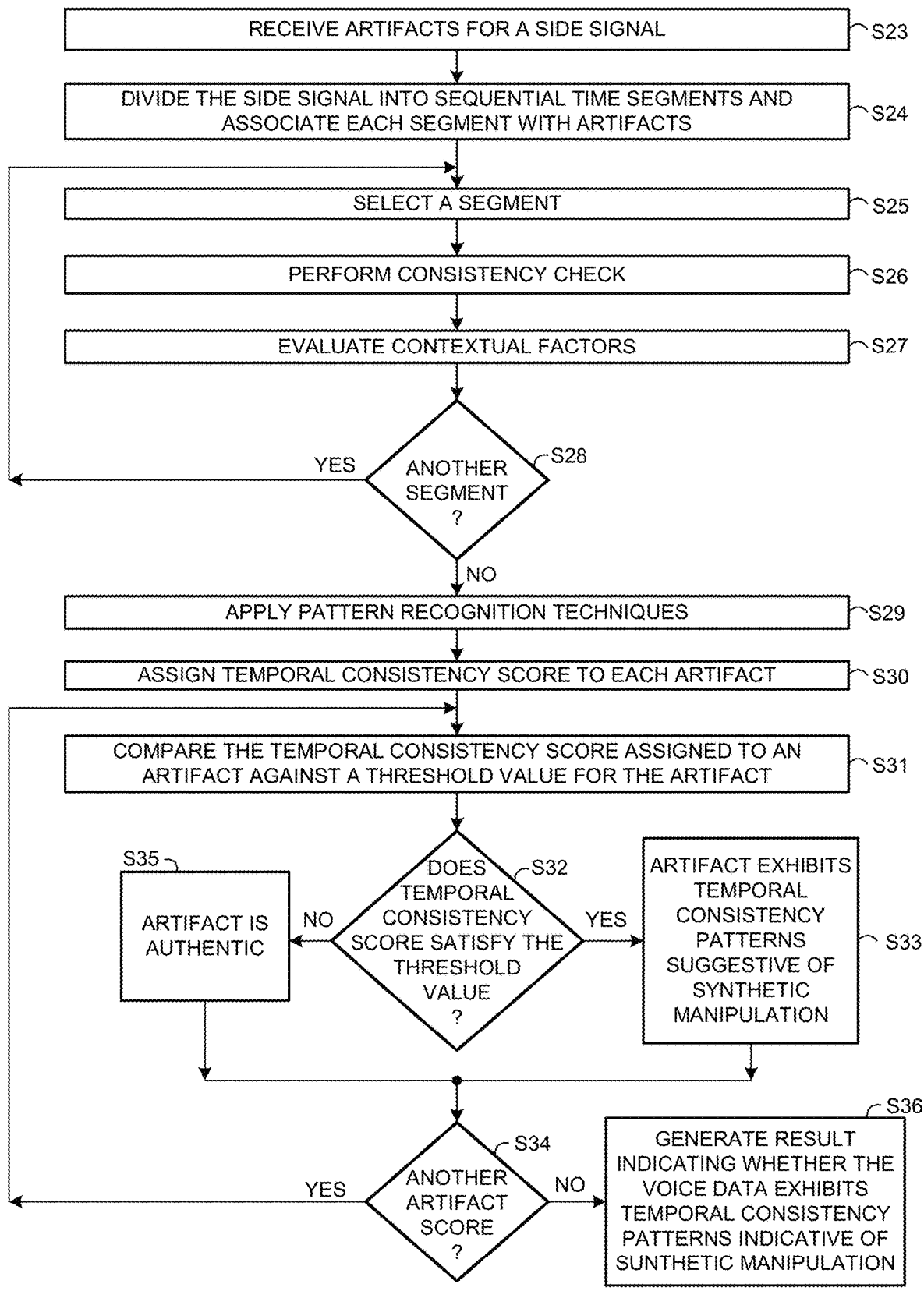
FIG. 8 is a diagram illustrating an example method and algorithm for evaluating the temporal attributes of artifacts detected in the side signal according to an embodiment of the present disclosure.

FIG. 8 is a diagram illustrating an example method and algorithm for evaluating the temporal attributes of artifacts detected in the side signal according to an embodiment of the present disclosure. The example method and algorithm facilitate distinguishing between incidental artifacts like noise and structured, consistent artifacts indicative of synthetic generation. FIG. 8 illustrates example steps performed when the electronic device 10 runs software 38 stored in the memory 18 to evaluate the temporal attributes of artifacts and spectral features detected in the side signal.

In step S23, the software 38 executed by the processor 16 causes the electronic device 10 to receive artifacts for the side signal. The artifacts may be, for example, as generated from the methods and algorithms described herein with regard to FIG. 6. Next, in step S24, the software 38 executed by the processor 16 causes the electronic device 10 to divide the side signal into sequential time segments and to associate each segment with the artifacts determined for the respective segment.

Next, in step S25, the software 38 executed by the processor 16 causes the electronic device 10 to select one of the segments. The one segment may be selected in any manner. In step S26, the software 38 executed by the processor 16 causes the electronic device 10 to perform a consistency check for each artifact associated with the one segment. More specifically, in step S26, the software 38 executed by the processor 16 causes the electronic device 10 to check for similar artifacts in segments subsequent to and preceding the one segment. Consistent appearance of similar artifacts across multiple segments may indicate a structured pattern characteristic of synthetic manipulation instead of random, isolated occurrences.

In step S27, the software 38 executed by the processor 16 causes the electronic device 10 to evaluate contextual factors associated with the one segment, for example, the recording environment and noise. Doing so facilitates ensuring that detected temporal patterns are not false positive results stemming from legitimate environmental acoustics or standard recording artifacts.

In step S28, the software 38 executed by the processor 16 causes the electronic device 10 to determine whether another segment is available that was not subject to the consistency check or the contextual factor evaluation. If so, in step S25, the software 38 executed by the processor 16 causes the electronic device 10 to select another segment. However, if another segment is not available, in step S29, the software 38 executed by the processor 16 causes the electronic device 10 to apply pattern recognition techniques to detect repetitive or non-random artifact patterns over time between the segments that are characteristic of synthetic manipulations. Such patterns are quantified and categorized based on their complexity and predictability, which are atypical for natural ambient fluctuations. The patterns may also be compared against record artifact patterns to detect correlations indicative of synthetic generation.

Next, in step S30, the software 38 executed by the processor 16 causes the electronic device 10 to assign a temporal consistency score to each different artifact based on the artifact's temporal consistency and pattern complexity. That is, the artifact's consistent occurrence across multiple segments over time. It should be understood that higher temporal consistency scores are assigned to artifacts that regularly occur throughout the segments.

In step S31, the software 38 executed by the processor 16 causes the electronic device 10 to compare the temporal consistency score assigned to one of the different artifacts against a threshold value for the one artifact. The threshold score for each different artifact can be established through empirical analysis, to ensure differentiating between genuine recordings and potential deepfakes.

In step S32, the software 38 executed by the processor 16 causes the electronic device 10 to determine whether the temporal consistency score satisfies the threshold value. If the temporal consistency score satisfies the threshold value, in step S33, the software 38 executed by the processor 16 causes the electronic device 10 to determine that the one artifact exhibits temporal consistency patterns suggestive of synthetic manipulation. Next, in step S34, the software 38 executed by the processor 16 causes the electronic device 10 to determine whether another artifact temporal consistency score remains to be compared against the respective threshold value. If so, in step S31, the software 38 executed by the processor 16 causes the electronic device 10 to compare the temporal consistency score for the other artifact against the corresponding threshold value for the other artifact.

However, in step S32, when the temporal consistency score fails to satisfy the threshold value, in step S35, the software 38 executed by the processor 16 causes the electronic device 10 to determine the artifact is authentic, not the product of synthetic manipulation. Next, in step S34, the software 38 executed by the processor 16 causes the electronic device 10 to determine whether another artifact temporal consistency score remains to be compared against the respective threshold value. If so, in step S31, the software 38 executed by the processor 16 causes the electronic device 10 to compare the temporal consistency score for the other artifact against the corresponding threshold value for the other artifact.

However, in step S34, if the temporal consistency scores of all the artifacts have been compared against the respective threshold value, in step S36, the software 38 executed by the processor 16 causes the electronic device 10 to generate a result indicating whether the voice data exhibits temporal consistency patterns indicative of synthetic manipulation.

The threshold value may be satisfied when a temporal consistency score is less than or equal to the threshold value. Other threshold values may be satisfied when the temporal consistency score is equal to or greater than the threshold value. Alternatively, the threshold value may include multiple threshold values, each of which is required to be satisfied to satisfy the threshold value. Any threshold may be established that facilitates differentiating between likely incidental artifacts like noise and structured, consistent artifacts indicative of synthetic generation.

The methods and algorithms for evaluating the temporal attributes of artifacts detected in a side signal as described herein analyze the occurrence duration, frequency, and consistency of each structured and secondary artifact within the side signal over a time period to distinguish between transient noise and sustained, structured anomalies indicative of synthetic generation. Using the methods and algorithms for evaluating the temporal attributes of artifacts detected in a side signal as described herein enables distinguishing genuine voice data from synthetic manipulations to enhance the reliability and efficacy of voice data authentication processes.

The development of artificial intelligence (AI) and machine learning (ML) technologies has enabled the development of synthetic speech and deep fake technologies capable of generating synthetic speech that can be difficult to distinguish from genuine human speech. Such synthetic speech may mimic the intonation, rhythm, and emotional nuances of genuine human speech. As a result, synthetic speech may be a threat to security systems that use voice data to authenticate or verify the identities of people. Specifically, synthetic speech may increase the risks of successfully perpetuating identity fraud on people and institutions, increase the risk of unauthorized access to confidential information stored on computer systems as well as the computer systems themselves, and increase the risks that misinformation campaigns will be successful amongst other things.

Known security systems, including conventional voice watchlist systems, are generally designed to detect known security threats based on historical data or predefined criteria. Moreover, known systems typically analyze human voice digital streams and recordings that are predominantly monophonic. That is, voice digital streams and recordings limited to one audio channel. Unfortunately, such security systems have been known to fail to identify synthetic speech in the form of voice digital streams and recordings limited to one audio channel.

To address these problems the electronic device 10 may convert monophonic voice data into stereophonic voice data. The stereophonic voice data includes a first channel signal and a second channel signal. Moreover, the electronic device 10 may decompose, using a trained machine learning model, the stereophonic voice data into a mid-signal and a side signal. The side signal can represent the difference between the first and second channel signals. Furthermore, the electronic device 10 can analyze the side signal to detect structured artifacts associated with synthetic voice generation. The structured artifacts are detected based on deviations from expected patterns in natural human speech.

A spectral analysis of the side signal can be conducted to detect secondary artifacts. The secondary artifacts include frequency components or modulations uncharacteristic of human speech. The electronic device 10 can also determine artifacts indicative of synthetic generation in the structured and secondary artifacts, and calculate, based on the determined artifacts, a probability score reflecting the likelihood the monophonic voice data was synthetically generated. The probability score can be compared against a threshold value. In response to determining the probability score satisfies the threshold value, the electronic device can determine there is a high likelihood that the monophonic voice data includes synthetic artifacts and can generate an alert indicating the monophonic voice data is potentially fraudulent.

Figure 9:
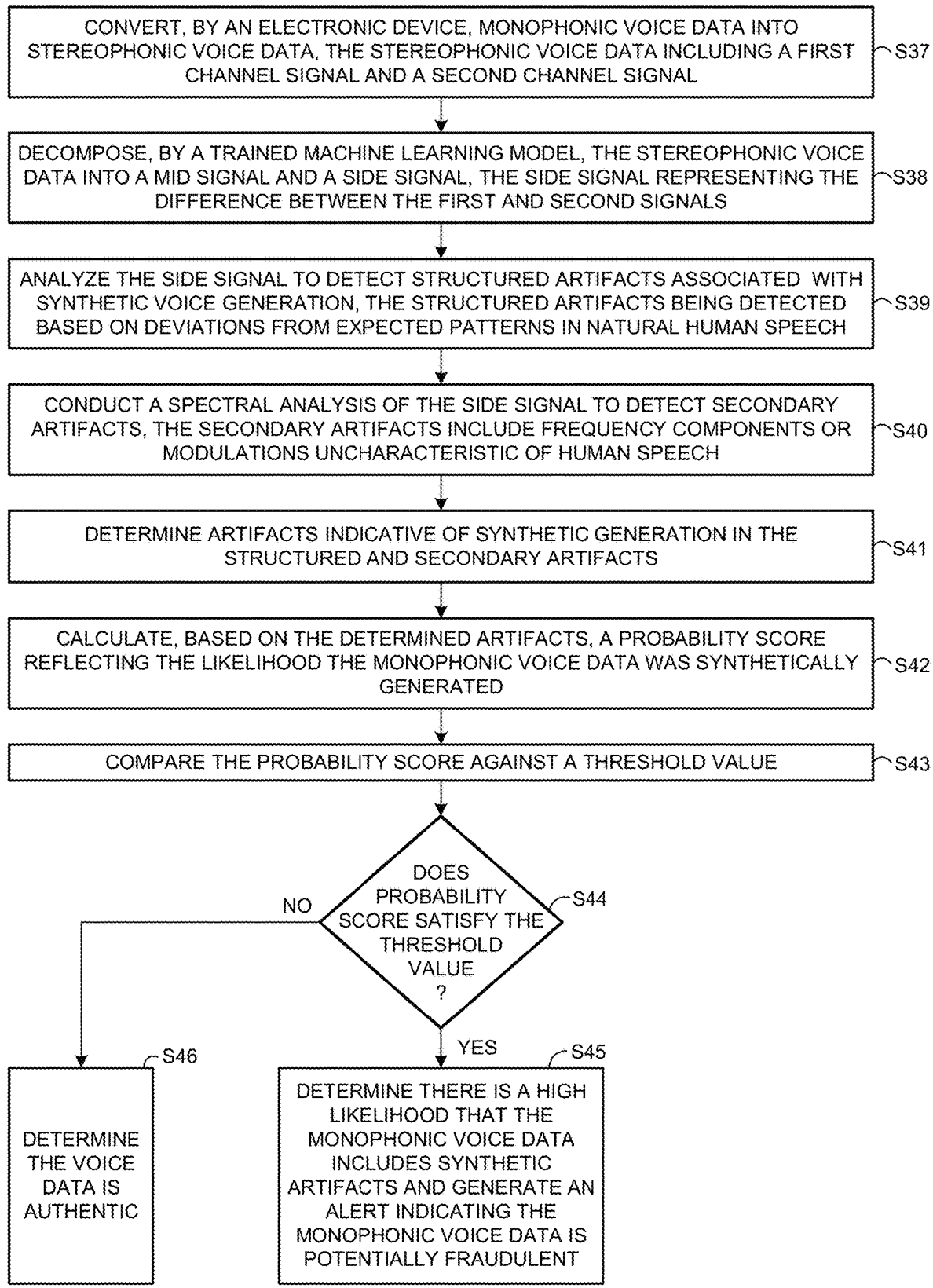
FIG. 9 is a diagram illustrating an example method and algorithm for enhancing detection of synthetic voice data according to an embodiment of the present disclosure.

FIG. 9 is a diagram illustrating an example method and algorithm for enhancing detection of synthetic voice data according to an embodiment of the present disclosure. A user may be required to authenticate his or her identity before being permitted to conduct, using the electronic device 10, a desired network-based transaction. Such network-based transactions include, but are not limited to, buying merchandise from a merchant service provider website, accessing top secret information from a computer system, or opening an account at a financial institution. Detecting synthetic voice data would facilitate reducing fraud and related inconvenience and costs. FIG. 9 illustrates example steps performed when the electronic device 10 runs software 38 stored in the memory 18 to enhance detection of synthetic voice data.

In step S37, the software 38 executed by the processor 16 causes the electronic device 10 to convert monophonic voice data into stereophonic voice data. The stereophonic voice data includes a first channel signal and a second channel signal. Next, in step S38, the software 38 executed by the processor 16 causes the electronic device 10 to decompose the stereophonic voice data into a mid-signal and a side signal. The side signal represents the difference between the first and second channels. In step S39, the software 38 executed by the processor 16 causes the electronic device 10 to analyze the side signal to detect structured artifacts associated with synthetic voice generation, for example, as described herein with regard to FIG. 6. The structured artifacts are detected based on deviations from expected patterns in natural human speech. In step S40, the software 38 executed by the processor 16 causes the electronic device 10 to conduct a spectral analysis of the side signal to detect secondary artifacts, for example, as described herein with regard to FIG. 7.

The secondary artifacts include frequency components or modulations uncharacteristic of human speech. It is contemplated by the present disclosure that secondary artifacts include anomalies detected as a result of analyzing spectral features of the side signal and anomalies detected as a result of analyzing statistical features of the side signal.

In step S41, the software 38 executed by the processor 16 causes the electronic device 10 to determine artifacts indicative of synthetic generation in the structured and secondary artifacts, for example, as described herein with regard to FIGS. 6 and 7.

In step S42, the software 38 executed by the processor 16 causes the electronic device 10 to calculate, based on the determined structured and secondary artifacts, a probability score reflecting the likelihood the monophonic voice data was synthetically generated. In step S43, the software 38 executed by the processor 16 causes the electronic device 10 to compare the probability score against a threshold value.

In step S44, the software 38 executed by the processor 16 causes the electronic device 10 to determine whether the probability score satisfies the threshold value. In response to determining the probability score satisfies the threshold value, in step S45 the software 38 executed by the processor 16 causes the electronic device 10 to determine there is a high likelihood that the monophonic voice data includes synthetic artifacts and to generate an alert indicating the monophonic voice data is potentially fraudulent. Otherwise, in response to determining the probability score fails to satisfy the threshold value, in step S46 the software 38 executed by the processor 16 causes the electronic device 10 to determine the voice data is authentic.

The threshold value may be satisfied when a probability score is less than or equal to the threshold value. Other threshold values may be satisfied when the probability score is equal to or greater than the threshold value. Alternatively, the threshold value may include multiple threshold values, each of which is required to be satisfied to satisfy the threshold value.

Using the method and algorithm for enhancing detection of synthetic voice data as described herein enables faster and more accurate detection of synthetic voice data by leveraging nuanced artifact patterns that deepfake technologies inadvertently introduce into synthetic voice data. As a result, the method and algorithm for enhancing detection of synthetic voice data as described herein facilitates enhancing a reduction in risks associated with conducting different kinds of network-based transactions while enhancing security against spoofing attacks and facilitating a reduction in costs incurred due to successful spoofing attacks as well as the inconvenience experienced by users who are victims of successful spoofing attacks.

It is contemplated by the present disclosure that the example methods and algorithms described herein may be implemented as one or more machine learning models that may be periodically retrained with data captured during, for example, authentication transactions of the same or different users. Doing so facilitates adapting the example methods and algorithms described herein to evolving synthetic speech generation techniques which further facilitates the reduction of risks associated with conducting network-based transactions. The machine learning models may be retrained after any period of time, for example, every three to six months.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. For any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of synthetic voice data comprising the steps of:

converting, by an electronic device, monophonic voice data into stereophonic voice data, the stereophonic voice data comprising a first channel signal and a second channel signal;

decomposing, by a trained machine learning model, the stereophonic voice data into a mid-signal and a side signal, the side signal representing a difference between the first and second channel signals;

analyzing the side signal to detect structured artifacts associated with synthetic voice generation, the structured artifacts being detected based on deviations from expected patterns in natural human speech;

conducting a spectral analysis of the side signal to detect secondary artifacts, the secondary artifacts include frequency components or modulations uncharacteristic of human speech;

determining artifacts indicative of synthetic generation in the structured and secondary artifacts;

calculating, based on the determined artifacts, a probability score reflecting the likelihood the monophonic voice data was synthetically generated;

comparing the probability score against a threshold value; and in response to determining the probability score satisfies the threshold value, determining there is a high likelihood that the monophonic voice data includes synthetic artifacts and generating an alert indicating the monophonic voice data is potentially fraudulent.

2. The method according to claim 1, said analyzing the side signal step comprising:

normalizing the side signal;

extracting, by the trained machine learning model, a set of statistical features from the normalized side signal, the features including at least spectral flux, zero-crossing rate, and energy entropy;

analyzing the set of statistical features over time to detect enduring patterns and transient anomalies that are atypical of human voice data; and detecting the structured artifacts within the enduring patterns inconsistent with human speech dynamics.

3. The method according to claim 1, said conducting a spectral analysis step comprising:

extracting spectral features from the side signal;

comparing each spectral feature against a respective baseline spectrum derived from authentic human voice recordings;

calculating a deviation of each spectral feature from the respective baseline spectrum;

calculating an anomaly score for each spectral feature based on the calculated deviation;

comparing each anomaly score against a dynamically adjustable threshold value; and in response to determining one of the anomaly scores satisfies the dynamically adjustable threshold value, deeming the monophonic voice data as potentially synthetic.

4. The method according to claim 1, said analyzing the side signal step comprising;

normalizing the side signal; extracting measurements for statistical features from the normalized side signal, the features being spontaneous and non-repetitive and being typically absent from authentic human speech;

detecting structured artifacts in the normalized side signal using the extracted measurements;

characterizing each structured artifact based on the respective statistical properties of the structured artifact; and mapping the detected structured artifacts against record synthetic artifacts.

5. The method according to claim 1, said conducting a spectral analysis step comprising:
   dividing the side signal according to frequency;
   comparing spectral features of the side signal against a respective record baseline spectrum;
   assigning an anomaly score to each spectral feature based on a deviation from the respective baseline spectrum;
   comparing each anomaly score against a spectral threshold value; and
   determining anomaly scores that satisfy the spectral threshold value indicate a high likelihood of synthetic manipulation.

6. The method according to claim 1, said determining artifacts indicative of synthetic generation step comprising:
   analyzing an occurrence duration, frequency, and consistency of each structured and secondary artifact within the side signal over a time period to distinguish between transient noise and sustained, structured anomalies indicative of synthetic generation;
   detecting, using pattern recognition algorithms, repetitive or non-random artifact structures characteristic of synthetic voice manipulations; comparing artifact patterns in the side signal with record artifact patterns to detect correlations indicative of synthetic generation;
   assigning scores to artifacts based on temporal consistency and pattern complexity, where assigned scores that satisfy an artifact threshold indicate a greater likelihood of being synthetically generated; and
   establishing threshold values for anomaly temporal consistency scores that differentiate between likely incidental and synthetic artifacts, where anomaly temporal consistency scores that satisfy the established threshold values confirm synthetic intervention.

7. The method according to claim 1, further comprising:
   updating the trained machine learning model by incorporating new voice data into a training set, the new voice data including verified authentic recordings and detected synthetic artifacts;
   adjusting training parameters of the machine learning model based on evolving characteristics of synthetic voice generation techniques;
   incorporating feedback on detection accuracy, including false positive and false negative results, to refine predictive capabilities of the trained machine learning model;
   evaluating performance of the trained machine learning model using standard metrics including precision, recall, and F1-score;
   updating the trained machine learning model to optimize standard metrics of the trained machine learning model; and
   enhancing the robustness of the trained machine learning model against a range of synthetic artifacts and recording conditions by employing techniques including synthetic data generation and noise addition.

8. An electronic device for enhancing detection of synthetic voice data comprising:
   a processor; and
   a memory configured to store data, said electronic device being associated with a network and said memory being in communication with said processor and having instructions stored thereon which, when read and executed by said processor, cause said electronic device to:
   convert monophonic voice data into stereophonic voice date, the stereophonic voice data comprising a first channel signal and a second channel signal;
   decompose, by a trained machine learning model operated by said electronic device, the stereophonic voice data into a mid-signal and a side signal, the side signal representing a difference between the first and second channel signals;
   analyze the side signal to detect structured artifacts associated with synthetic voice generation, the structured artifacts being detected based on deviations from expected patterns in natural human speech;
   conduct a spectral analysis of the side signal to detect secondary artifacts, the secondary artifacts include frequency components or modulations uncharacteristic of human speech; determine artifacts indicative of synthetic generation in the structured and secondary artifacts;
   calculate, based on the determined artifacts, a probability score reflecting the likelihood the monophonic voice data was synthetically generated;
   compare the probability score against a threshold value; and
   in response to determining the probability score satisfies the threshold value, determine there is a high likelihood that the monophonic voice data includes synthetic artifacts and generating an alert indicating the monophonic voice data is potentially fraudulent.

9. The electronic device according to claim 8, wherein the instructions when read and executed by said processor, cause said electronic device to:
   normalize the side signal;
   extract, by the trained machine learning model, a set of statistical features from the normalized side signal, the features including at least spectral flux, zero-crossing rate, and energy entropy;
   analyze the set of statistical features over time to detect enduring patterns and transient anomalies that are atypical of human voice data; and
   detect the structured artifacts within the enduring patterns inconsistent with human speech dynamics.

10. The electronic device according to claim 8, wherein the instructions when read and executed by said processor, cause said electronic device to:
    extract spectral features from the side signal;
    compare each spectral feature against a respective baseline spectrum derived from authentic human voice recordings;
    calculate a deviation of each spectral feature from the respective baseline spectrum;
    calculate an anomaly score for each spectral feature based on calculated deviation;
    compare each anomaly score against a dynamically adjustable threshold value; and
    in response to determining one of the anomaly scores satisfies the dynamically adjustable threshold value, deem the monophonic voice data as potentially synthetic.

11. The electronic device according to claim 8, wherein the instructions when read and executed by said processor, cause said electronic device to:
    normalize the side signal;
    extract measurements for statistical features from the normalized side signal, the statistical features being spontaneous and non-repetitive and being typically absent from authentic human speech;

detect structured artifacts in the normalized side signal using the extracted measurements;
characterize each structured artifact based on the respective statistical properties of the structured artifact; and
map the detected structured artifacts against record synthetic artifacts.

12. The electronic device according to claim 8, wherein the instructions when read and executed by said processor, cause said electronic device to:
divide the side signal according to frequency;
compare spectral features of the side signal against a respective baseline spectrum;
assign an anomaly score to each spectral feature based on a deviation from the respective baseline spectrum;
compare each anomaly score against a spectral threshold value; and
determine anomaly scores that satisfy the spectral threshold value indicate a high likelihood of synthetic manipulation.

13. The electronic device according to claim 8, wherein the instructions when read and executed by said processor, cause said electronic device to:
analyze an occurrence duration, frequency, and consistency of each structured and secondary artifact within the side signal over a time period to distinguish between transient noise and sustained, structured anomalies indicative of synthetic generation;
detect, using pattern recognition algorithms, repetitive or non-random artifact structures characteristic of synthetic voice manipulations;
compare artifact patterns in the side signal with record artifact patterns to detect correlations indicative of synthetic generation;
assign scores to artifacts based on temporal consistency and pattern complexity, where assigned scores that satisfy an artifact threshold value indicate a greater likelihood of being synthetically generated; and
establish threshold values for anomaly temporal consistency scores that differentiate between likely incidental and synthetic artifacts, where anomaly temporal consistency scores that satisfy the established threshold values confirm synthetic intervention.

14. The electronic device according to claim 8, wherein the instructions when read and executed by said processor, cause said electronic device to:
update the trained machine learning model by incorporating new voice data into a training set, the new voice data including verified authentic recordings and detected synthetic artifacts;
adjust training parameters of the machine learning model based on evolving characteristics of synthetic voice generation techniques;
incorporate feedback on detection accuracy, including false positive and false negative results, to refine predictive capabilities of the trained machine learning model;
evaluate performance of the trained machine learning model using standard metrics including precision, recall, and F1-score;
update the trained machine learning model to optimize standard metrics of the trained machine learning model; and
enhance the robustness of the trained machine learning model against a range of synthetic artifacts and recording conditions by employing techniques including synthetic data generation and noise addition.

15. A non-transitory computer-readable recording medium in an electronic device for enhancing detection of synthetic voice data, the non-transitory computer-readable recording medium storing instructions which when executed by a hardware processor cause the non-transitory recording medium to perform steps comprising:
converting monophonic voice data into stereophonic voice data, the stereophonic voice data comprising a first channel signal and a second channel signal;
decomposing, by a trained machine learning model, the stereophonic voice data into a mid-signal and a side signal, the side signal representing a difference between the first and second channel signals;
analyzing the side signal to detect structured artifacts associated with synthetic voice generation, the structured artifacts being detected based on deviations from expected patterns in natural human speech;
conducting a spectral analysis of the side signal to detect secondary artifacts, the secondary artifacts include frequency components or modulations uncharacteristic of human speech; determining artifacts indicative of synthetic generation in the structured and secondary artifacts;
calculating, based on the determined artifacts, a probability score reflecting the likelihood the monophonic voice data was synthetically generated; comparing the probability score against a threshold value; and
in response to determining the probability score satisfies the threshold value, determining there is a high likelihood that the monophonic voice data includes synthetic artifacts and generating an alert indicating the monophonic voice data is potentially fraudulent.

16. The non-transitory computer-readable recording medium according to claim 15, wherein the instructions when read and executed by said processor, cause said non-transitory computer-readable recording medium to perform steps compromising:
normalizing the side signal;
extracting, by the trained machine learning model, a set of statistical features from the normalized side signal, the features including at least spectral flux, zero-crossing rate, and energy entropy;
analyzing the set of statistical features over time to detect enduring patterns and transient anomalies that are atypical of human voice data; and
detecting the structured artifacts within the enduring patterns inconsistent with human speech dynamics.

17. The non-transitory computer-readable recording medium according to claim 15, wherein the instructions when read and executed by said processor, cause said non-transitory computer-readable recording medium to perform steps compromising:
extracting spectral features from the side signal;
comparing each spectral feature against a respective baseline spectrum derived from authentic human voice recordings;
calculating a deviation of each spectral feature from the respective baseline spectrum;
calculating an anomaly score for each spectral feature based on the calculated deviation;
comparing each anomaly score against a dynamically adjustable threshold value; and
in response to determining one of the anomaly scores satisfies the dynamically adjustable threshold value, deeming the monophonic voice data as potentially synthetic.

18. The non-transitory computer-readable recording medium according to claim 15, wherein the instructions when read and executed by said processor, cause said non-transitory computer-readable recording medium to perform steps compromising:
- normalizing the side signal;
  - extracting measurements for statistical features from the normalized side signal;
  - detecting structured artifacts in the normalized side signal using the extracted measurements;
  - characterizing each structured artifact based on the respective statistical properties of the structured artifact; and
  - mapping the detected structured artifacts against record synthetic artifacts.

19. The non-transitory computer-readable recording medium according to claim 15, wherein the instructions when read and executed by said processor, cause said non-transitory computer-readable recording medium to perform steps compromising:
- dividing the side signal according to frequency;
- comparing spectral features of the side signal against a respective baseline spectrum;
- assigning an anomaly score to each spectral feature based on a deviation from the respective record baseline spectrum;
- comparing each anomaly score against a spectral threshold value; and
- determining anomaly scores that satisfy the spectral threshold value indicate a high likelihood of synthetic manipulation.

20. The non-transitory computer-readable recording medium according to claim 15, wherein the instructions when read and executed by said processor, cause said non-transitory computer-readable recording medium to perform steps compromising:
- analyzing an occurrence duration, frequency, and consistency of each structured and secondary artifact within the side signal over a time period to distinguish between transient noise and sustained, structured anomalies indicative of synthetic generation;
- detecting, using pattern recognition algorithms, repetitive or non-random artifact structures characteristic of synthetic voice manipulations;
- comparing artifact patterns in the side signal with record artifact patterns to detect correlations indicative of synthetic generation;
- assigning scores to artifacts based on temporal consistency and pattern complexity, where assigned scores that satisfy an artifact threshold value indicate a greater likelihood of being synthetically generated; and
- establishing threshold values for anomaly temporal consistency scores that differentiate between likely incidental and synthetic artifacts, where anomaly temporal consistency scores that satisfy the established threshold values confirm synthetic intervention.

* * * * *